United States Patent
Buening et al.

(10) Patent No.: US 11,089,907 B2
(45) Date of Patent: Aug. 17, 2021

(54) ELECTRIC MOTOR OPERATED KITCHEN APPLIANCE

(71) Applicant: Vorwerk & Co. Interholding GmbH, Wuppertal (DE)

(72) Inventors: Thomas Buening, Bochum (DE); Robert Frielinghaus, Bochum (DE); Martin Helmich, Duisburg (DE)

(73) Assignee: Vorwerk & Co. Interholding GmbH, Wuppertal (DE)

( * ) Notice: Subject to any disclaimer, the term of this patent is extended or adjusted under 35 U.S.C. 154(b) by 192 days.

(21) Appl. No.: 16/156,126

(22) Filed: Oct. 10, 2018

(65) Prior Publication Data

US 2019/0104886 A1 Apr. 11, 2019

(30) Foreign Application Priority Data

Oct. 11, 2017 (DE) .................. 10 2017 123 689.9

(51) Int. Cl.
| | |
|---|---|
| *A47J 42/10* | (2006.01) |
| *A47J 43/046* | (2006.01) |
| *A47J 42/06* | (2006.01) |
| *A47J 43/07* | (2006.01) |
| *A47J 42/02* | (2006.01) |

(52) U.S. Cl.
CPC .............. *A47J 42/10* (2013.01); *A47J 42/06* (2013.01); *A47J 43/046* (2013.01); *A47J 43/0716* (2013.01); *A47J 42/02* (2013.01)

(58) Field of Classification Search
CPC .. A47J 42/10; A47J 42/06; A47J 42/02; A47J 43/046; A47J 43/0716; A47J 43/06

USPC ............................ 241/100, 92, 282.1, 282.2
See application file for complete search history.

(56) References Cited

U.S. PATENT DOCUMENTS

| | | | | |
|---|---|---|---|---|
| 3,542,178 A | * | 11/1970 | Ripple | F16D 1/101 192/69.9 |
| 4,200,244 A | * | 4/1980 | Sontheimer | A47J 43/0722 241/282.1 |
| 4,634,061 A | * | 1/1987 | Williams | A47J 42/06 241/101.01 |

FOREIGN PATENT DOCUMENTS

| | | | |
|---|---|---|---|
| CN | 204909176 U | 12/2015 | |
| DE | 1233548 B | * 2/1967 | ............ A47J 42/06 |
| EP | 1 269 898 B1 | 4/2008 | |
| WO | 03/075727 A1 | 9/2003 | |

* cited by examiner

*Primary Examiner* — Shelley M Self
*Assistant Examiner* — Teresa A Guthrie
(74) *Attorney, Agent, or Firm* — Collard & Roe, P.C.

(57) ABSTRACT

An electric motor operated kitchen appliance has a base unit having an electric motor and a preparation vessel, which can be connected to the base unit and into which a rotating element protrudes, which can be rotationally driven by means of the electric motor, wherein a grinding element, which, with a grinding area of a grinding vessel held on the preparation vessel, forms a grinder, can be connected to the rotating element. To advantageously further develop the kitchen appliance, the grinding element is connected to the rotating element via a coupling element having at least one elastic partial area.

9 Claims, 5 Drawing Sheets

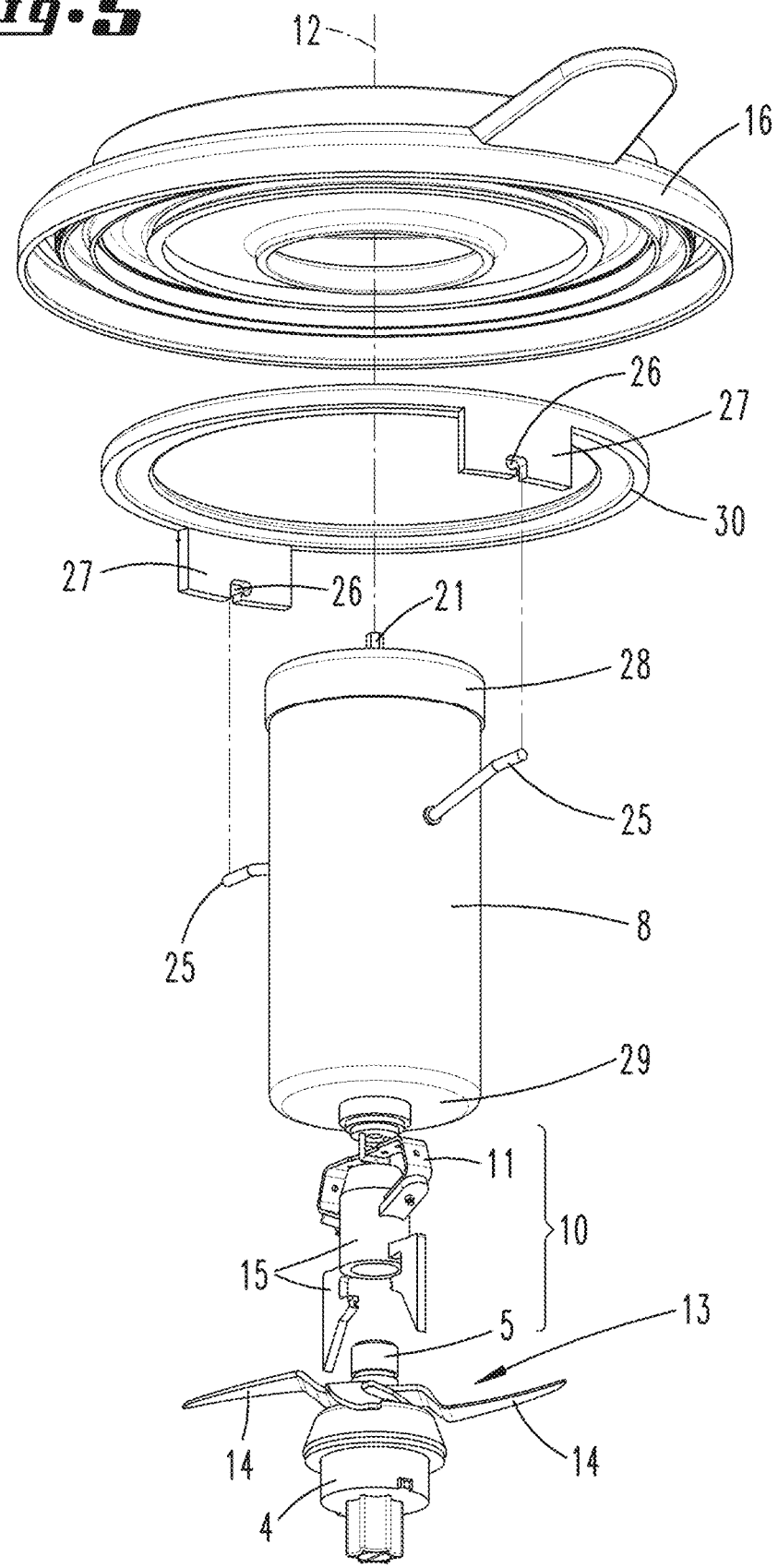

ELECTRIC MOTOR OPERATED KITCHEN APPLIANCE

CROSS-REFERENCE TO RELATED APPLICATIONS

This application claims priority of German Application No. 10 2017 123 689.9 filed on Oct. 11, 2017, the disclosure of which is herein incorporated by reference.

BACKGROUND OF THE INVENTION

1. Field of the Invention

The invention relates to an electric motor operated kitchen appliance comprising a base unit having an electric motor and a preparation vessel, which can be connected to the base unit and into which a rotating element protrudes, which can be rotationally driven by means of the electric motor, wherein a grinding element, which, with a grinding area of a grinding vessel held on the preparation vessel, forms a grinder, can be connected to the rotating element.

2. Description of the Related Art

Electric motor operated kitchen appliances comprising a base unit and a preparation vessel, which can be connected to the base unit, are well known in the prior art.

The publications WO 2003/075727 A1 and EP 1 269 898 B1 disclose such electromotive kitchen appliances, which are embodied as combined cooking-mixing appliances. The preparation vessel is a stirring vessel, through the vessel bottom of which a rotating element protrudes into the stirring vessel. A set of blades comprising a plurality of blades, which serve to comminute meals, is arranged on the rotating element.

CN 204909176 U furthermore discloses a kitchen appliance, which has a grinding element, which is connected to the rotating element and which forms a grinder with a grinding area of a grinding vessel.

SUMMARY OF THE INVENTION

Based on this, it is the object of the invention to further develop the grinder of the kitchen appliance in an advantageous manner.

To solve the above-mentioned object, it is proposed that the grinding element is connected to the rotating element via a coupling element having at least one elastic partial area. The coupling element can be a partial area of the grinding element or a partial area of the rotating element. It is furthermore possible that the coupling element is an element, which is separate from the grinding element as well as from the rotating element. The coupling element serves to connect the grinding element to the rotating element and simultaneously—by the formation of an elastic partial area—as flexible compensating element, to compensate an axial tilt of the grinding element in the grinding vessel and/or a radial displacement of the grinding element relative to the grinding vessel. Finally, impacts by the grinder, which occur in response to the comminution of the base products, are furthermore also dampened.

The kitchen appliance has a grinding element, which can be connected to the rotating element and which forms a grinder with a grinding area of a grinding vessel held on the preparation vessel. As variably usable accessory of the kitchen appliance, the grinder, which can be connected to the drive of the kitchen appliance, provides for a preparation of dishes from base products, which need to be ground initially. The base products can be, for example, grains, coffee beans or spice seeds. The grinder has a grinding area of the grinding vessel, which is immovably connected to the preparation vessel, so that the rotational movement of the rotating element is not transferred to the grinding vessel. The rotating element can be rotated relative to the preparation vessel and thus also to the grinding vessel, so that the grinding element, which is fastened to the rotating element, rotates relative to the grinding area of the grinding vessel and thereby grinds base materials located in the space between grinding area and grinding element. The grinding area is preferably a partial area of an inner wall of the grinding vessel, at which stored base products continue to flow and can be comminuted there by the grinding element. The grinding element is connected directly to a drive shaft of the electric motor via the rotating element. A direct drive is thus made possible. In contrast to the chopping of the base product by means of for example a set of blades, a gentle crush-grinding is furthermore made possible, in response to which the base product heats only slightly and obtains a more even grinding result. Provided that the grinder can be adjusted with regard to the distance between the grinding element and the grinding area, the grinding level can be fine-adjusted. The grinder can be embodied for example for spices with a fine-metering accurate to within a gram. As a whole, a separate coffee grinder, grain grinder or other grinder can thus be forgone as a result of the integration of a grinder in the kitchen appliance.

It is in particular proposed that the grinding element protrudes into the grinding vessel, wherein the grinding area surrounds the grinding element in the circumferential direction, so that the grinding element rotates in response to a grinding operation inside the grinding area. The grinding element is simultaneously located in the grinding vessel, which accommodates the base products, so that a partial area of the grinding vessel forms the grinder. It is in particular advisable to design the grinder in the manner of a conventional manually operated coffee grinder, in particular as conical grinder, in the case of which a conical grinding element is surrounded by a cylindrical grinding area. In response to the operation of the grinder, the grinding element rotates inside the cylindrical grinding area, so that the teeth of the grinding element and of the grinding area act mechanically on the base products located therebetween, for example grains or coffee beans. The comminuted grinding material can then initially be collected in a separate chamber of the grinding vessel, or, in the alternative, can also be discharged directly into the preparation vessel, so that the grinding material can be added for example directly to a meal, which is to be prepared, for example grain into a dough to be stirred, pepper into a stew and the like. During a meal preparation, the grinding material could furthermore be placed directly into a heating device, which is assigned to the preparation vessel, on top of a meal, which is heated to a preparation temperature.

It is also particularly advisable that the grinding vessel is arranged in the preparation vessel. It can in particular be provided that the grinding vessel is fastened to a wall or a cover of the preparation vessel, for example screwed thereto. In the case of an arrangement on a cover of the preparation vessel, it can in particular be provided that the grinding vessel can also be closed by means of the cover, so that the user cannot injure himself on the grinder. The grinding vessel can for example have protrusions, which protrude to the outside, which can be guided through boreholes in the cover of the preparation vessel and can be fastened there. By arranging the grinding vessel and thus also the grinder inside the preparation vessel, the portion of the exiting sound is very low. On the one hand, the base products cannot be thrown against the inner wall of the preparation vessel, and, on the other hand, the grinder is surrounded twice with a wall, namely on the one hand with the wall of the grinding vessel, and on the other hand, with the wall of the preparation vessel. If the connection between the grinding vessel and the preparation vessel is furthermore embodied via a sound-absorbing element, the sound emission can be reduced even further.

As an alternative to an arrangement of the grinding vessel inside the preparation vessel, the grinding vessel can also be attached to the preparation vessel, i.e. can be arranged outside of the preparation vessel. In this case, the rotating element of the kitchen appliance is extended by means of a drive shaft through the preparation vessel and preferably emerges from the preparation vessel in the area of a cover. The rotating element forms the drive for the external grinder. In the case of an arrangement of the grinding vessel inside the preparation vessel, the drive shaft can furthermore also be guided out of the preparation vessel towards the top and can drive further accessories there, such as, for example, a lemon/orange press, a meat grinder, a pasta maker, a can opener, a vegetable press and the like.

The grinding element can furthermore be separably connected to the rotating element. According to this embodiment, the grinding element is a separate element, which can be connected to the rotating element or can be separated therefrom particularly easily as needed. It is not required to completely remove the rotating element having the grinding element from a rotary bearing and to replace it with a different rotating element. Instead, only the grinding element as attachment can be separated from the rotating element, so that the rotating element can always remain in the kitchen appliance, namely in the rotary bearing. This saves time when using different accessories of the kitchen appliance.

It is proposed that the coupling element has a spring element. The spring element in particular has a range of motion both parallel to a longitudinal extension of an axis of rotation of the rotating element and perpendicular thereto. According to a particularly simple embodiment, the spring element can on principle be a flexible material area of the coupling element. It is furthermore possible that the spring element is embodied in the manner of a resilient bracket or ring, the spring plane of which is oriented parallel to the axis of rotation of the rotating element. According to a particularly preferred embodiment, the spring element can be a spring-elastic plastic ring, which is connected or can be connected to the grinding element on the one hand and to the rotating element on the other hand.

It is in particular proposed that the rotating element has a set of blades comprising a plurality of blades. According to this embodiment, the rotating element simultaneously represents the drive shaft for a set of blades, which typically serves to comminute or to stir food. The rotating element can thus drive a set of blades on the one hand and the grinding element on the other hand, so that a plurality of operating steps can be carried out simultaneously inside the kitchen appliance, namely for example the stirring of a meal located in the preparation vessel and the grinding of base products located inside the grinding vessel. The ground grinding material can be guided directly into the prepared meal inside the preparation vessel, namely for example through an outlet preferably on a bottom side of the grinding vessel.

It is proposed that the coupling element has a carrier element for releasably connecting the coupling element to the rotating element, wherein the carrier element can be secured in particular between adjacent blades of a set of blades. According to a possible embodiment, the carrier element can be a fork- or hook-shaped attachment, the points of which are in contact with the blades of the set of blades, in particular engage between the blades. In response to rotation of the set of blades, the grinder is thus simultaneously driven as well. Advantageously, the connection between the carrier element and the rotating element is embodied in such a way that it stops independently during the operation of the grinder, in particular also in response to a raising of the fill level inside the preparation vessel.

Lastly, it is proposed that the grinding vessel has a plurality of separate chambers for accommodating base products to be ground and/or for accommodating grinding material. The grinder is located in the grinding housing, which includes and supplies the base products. The grinding vessel is preferably open to the top or is closed by a cover. As proposed, a chamber system comprising a plurality of chambers can furthermore be provided, which, individually or jointly, can be opened or closed automatically or manually. By means of a particular housing shape, a size or shape of an opening of the grinding vessel or a closure, it can be ensured that the user cannot reach into the grinder and can injure himself. As further safety parameters, certain speed ranges or modes of the electric motor, which drives the rotating element, can be blocked, when a detection device of the kitchen appliance detects a presence of the grinding element and/or grinding vessel inside the kitchen appliance. The detection device can work for example mechanically, magnetically or in another way.

BRIEF DESCRIPTION OF THE DRAWINGS

The invention will be described in more detail below by means of exemplary embodiments:

FIG. 5 shows an exploded illustration of the combination shown in FIG. 4.

DETAILED DESCRIPTION OF THE PREFERRED EMBODIMENTS

Figure 1:
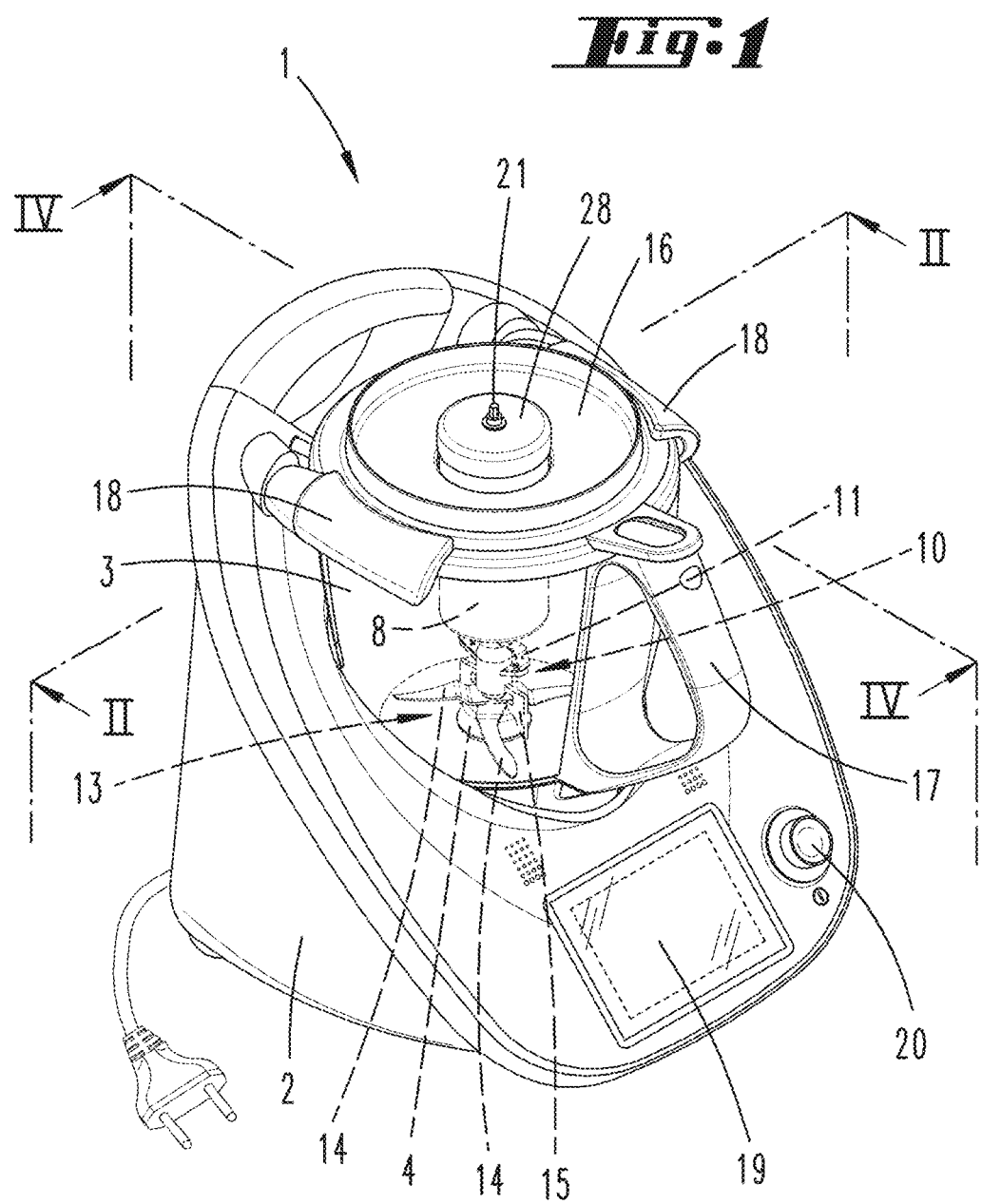
FIG. 1 shows a kitchen appliance according to the invention in a perspective view.

FIG. 1 shows an electric motor operated kitchen appliance 1, which is embodied here as combined cooking-mixing appliance. The kitchen appliance 1 has a base unit 2, into which a preparation vessel 3 is inserted. A heating device, which is not illustrated in more detail, is assigned to the preparation vessel 3, here preferably integrated into the vessel bottom of the preparation vessel 3. A rotary bearing 4, which rotatably supports the rotating element 5, is furthermore inserted in the vessel bottom of the preparation vessel 3. The rotating element 5 is connected to a set of blades 13, which has a plurality of blades 14. A coupling element 10 for a grinding element 6 of a grinder 9 is furthermore connected to the set of blades 13 (see FIG. 2). The coupling element 10 has a carrier element 15, which engages with wing-like end areas between the blades 14 of the set of blades 13. The coupling element 10 furthermore has a spring element 11, which resiliently connects the coupling element 10 to the grinding element 6 of the grinder 9. The grinding element 6 is arranged in a grinding vessel 8, the inner wall of which provides a grinding area 7 for interaction with the grinding element 6. The grinding element 6 is embodied in a truncated cone-shaped manner and rotates, driven by the rotating element 5, inside the cylindrical grinding area 7, wherein grinding element 6 and grinding area 7 cooperate as grinder 9.

A cover 16, which can be connected to the preparation vessel 3 in a fluid-tight manner, with the help of closing rollers 18, is furthermore assigned to the preparation vessel 3. The preparation vessel 3 furthermore has a handle 17 for seizing the preparation vessel 3 by a user. The base unit 2 of the kitchen appliance 1 has a display 19 for displaying status parameters of the kitchen appliance 1, recipe suggestions, current parameters of the preparation material and the like located in the preparation vessel 3. A switch 20, here embodied for example as push-rotary button, serves to turn on and turn off the kitchen appliance 1 and/or to select and confirm a command or parameter displayed on the display 19. The cover 16 of the preparation vessel 3 has for example an opening here, through which a partial area of the grinding vessel 8 protrudes and is held in position, i.e. parallel to an axis of rotation 12 of the rotating element 5. A drive shaft 21, which has a rotationally fixed connection to the grinding element 6 and thus also to the rotating element 5 and which thus also rotates in response to rotation of the rotating element 5, protrudes through a vessel cover 28 of the grinding vessel 8.

Figure 2:
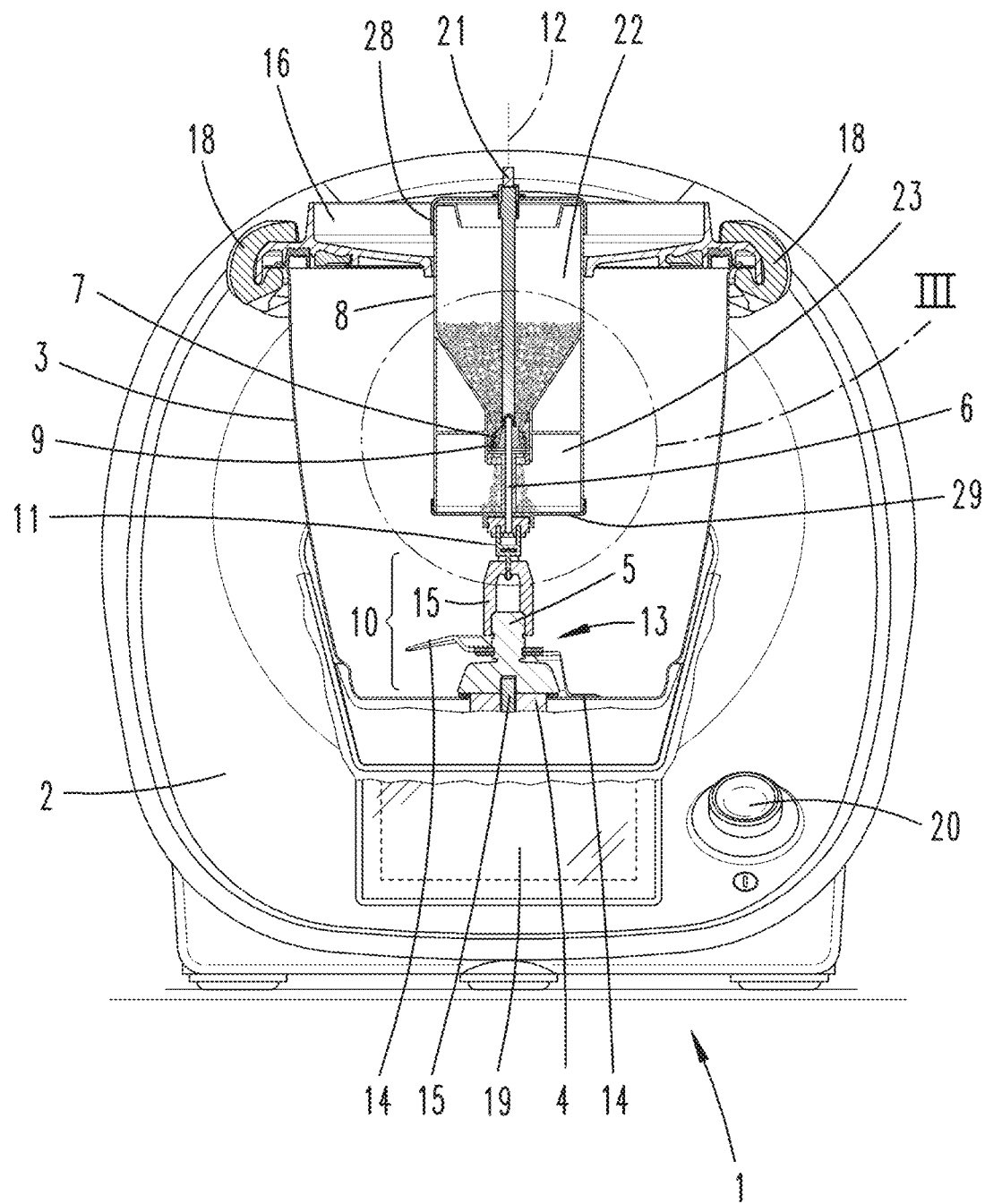
FIG. 2 shows a longitudinal section through the kitchen appliance.
Figure 3:
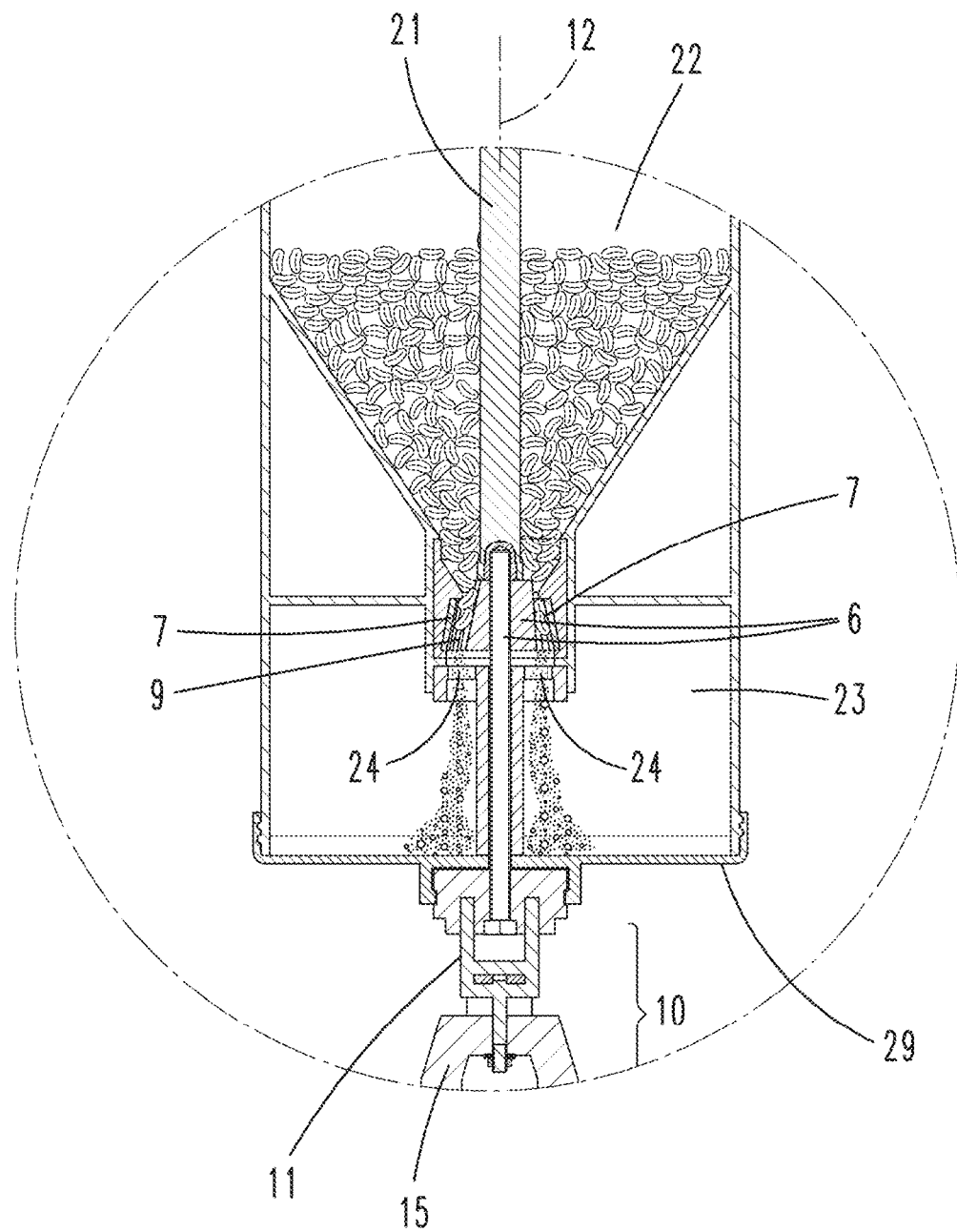
FIG. 3 shows an enlarged partial area of a preparation vessel or grinding vessel, respectively.

FIG. 2 shows a longitudinal section through the preparation vessel 3, which is connected to the base unit 2 of the kitchen appliance 1. The longitudinal section goes along the axis of rotation 12 of the rotating element 5. The grinding vessel 8 arranged in the preparation vessel 3 is furthermore illustrated in an enlarged manner in FIG. 3.

The rotating element 5 can be rotated by means of the electric motor of the kitchen appliance 1. By means of the connection of the grinding element 6 to the rotating element 5 via the coupling element 10, the grinding element 6 also rotates in response to rotation of the rotating element 5. The grinding element 6, together with the cylindrical grinding area 7 of the grinding vessel 8, forms a grinder 9. The grinder 9 is embodied as conical grinder here and is located inside the grinding vessel 8, which has a chamber 22 for a base product, which is to be ground, as well as a chamber 23 for the grinding material, which is ground by means of the grinder 9. An opening 24 (see FIG. 3), through which the grinding material can reach from the chamber 22 into the chamber 23, is located in the area of the grinder 9 between the chamber 22 and the chamber 23. The chamber 23 has a bottom 29 of the grinding vessel 8, which is connected to the grinding vessel 8 via a screw cap, so that the chamber 23 can be emptied upon separating the bottom 29 from the grinding vessel 8. By means of the funnel-shaped embodiment of the chamber 22, the base product, which is to be ground, always slides into the grinding area 7 of the chamber 22, so that the base product is continuously refilled into the grinder 9 and can be ground there.

The drive of the grinding element 6 by means of the rotating element 5 takes place via the coupling element 10, which connects the rotating element 5 and the grinding element 6 to one another in a rotationally fixed manner. The coupling element 10 engages with the fork-shaped carrier element 15 between the blades 14 of the set of blades 13. In response to a rotation of the set of blades 13, the coupling element 10 and thus also the grinding element 6 arranged thereon rotates as well. The spring element 11 of the coupling element 10 is an element of metal or plastic, which is elastic parallel to the axis of rotation 12 as well as perpendicular thereto, and which prevents an axial tilt of the grinder 9 in the grinding vessel 8 on the one hand, and compensates a radial displacement of the grinding vessel 8 inside the preparation vessel 3 on the other hand. The spring element 11 furthermore dampens impacts on the rotating element 5, which may occur as a result of the grinding operation of the grinder 9.

Figure 4:
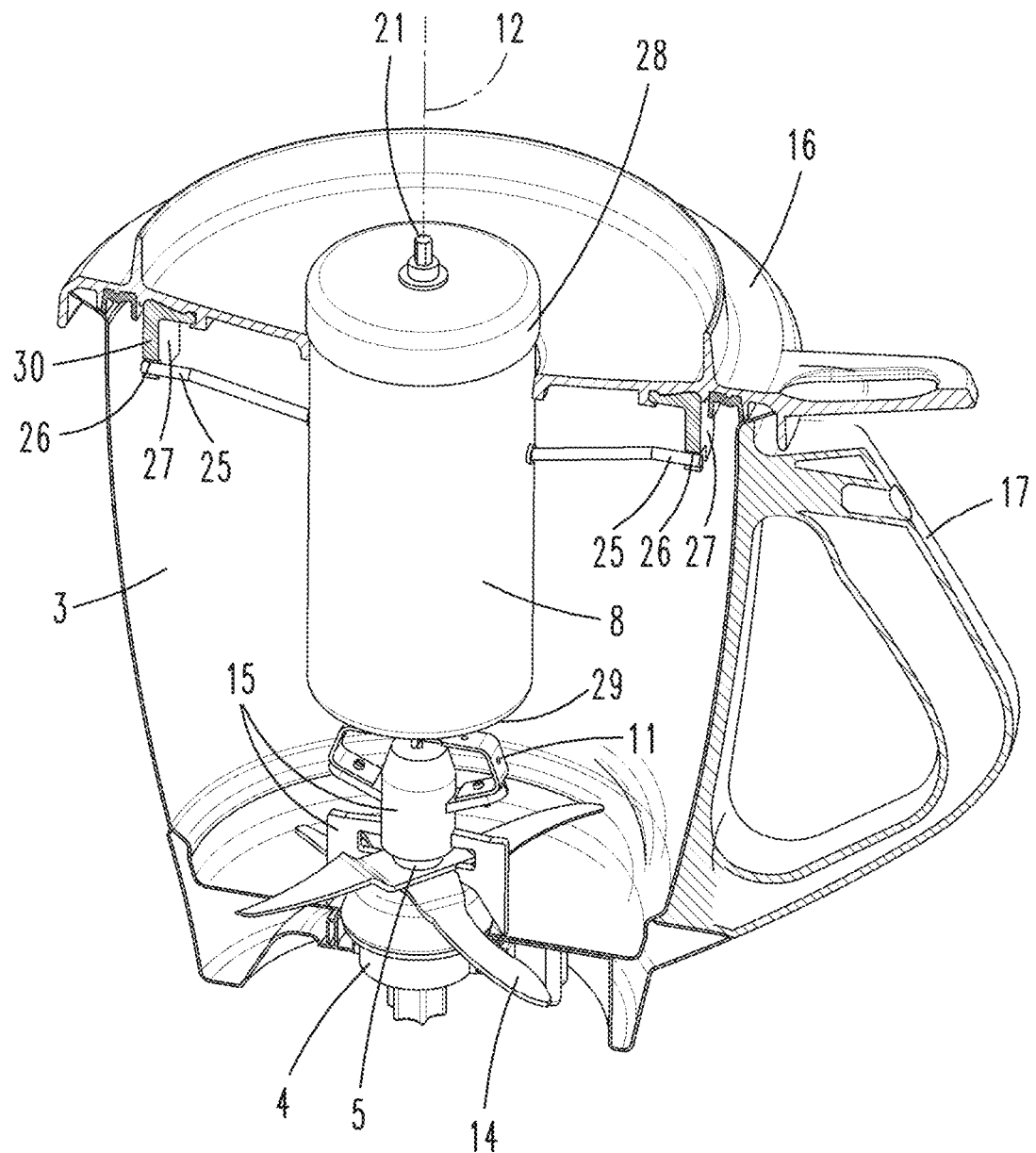
FIG. 4 shows a perspective view into a preparation vessel of the kitchen appliance comprising a grinding vessel located therein.

To prevent that the grinding vessel 8 also rotates in response to a rotation of the grinding element 6, the grinding vessel 8 is fastened to the preparation vessel 3. The fastening can take place either to a wall of the preparation vessel 3 or also to the cover 16 of the preparation vessel 3. FIG. 4 shows for example a fastening of the grinding vessel 8 to the cover 16. On the outer side, the grinding vessel 8 bears two fastening arms 25, which engage with accommodation 26, which are embodied on protrusions 27 of the cover 16. The accommodations 26 accommodate the fastening arms 25 in the manner of a bayonet closure. Provided that this connection is additionally equipped with a sound-absorbing element, a sound transfer from the grinder 9 of the grinding vessel 8 to the preparation vessel 3 can be reduced. Other connecting options between the grinding vessel 8 and the preparation vessel 3 are conceivable as well. According to an alternative embodiment, it can be provided, for example, that the grinding vessel 8 is arranged completely above the preparation vessel 3 and is thus located completely outside of the preparation vessel 3. However, the arrangement of the grinding vessel 8 inside the preparation vessel 3 is advantageous, because an additional sound-proofing is then created by means of the surrounding preparation vessel 3.

Even though this is not illustrated in more detail here, it can additionally be provided that other accessories are also driven via the rotating element 5 of the kitchen appliance 1. A drive shaft 21, which is connected to the grinding element 6 or the rotating element 5, respectively, and which protrudes outwards through the vessel cover 28, can be used for example to drive a fruit press, a meat grinder, a pasta maker, a can opener, a vegetable press or others.

FIG. 5 shows an exploded illustration comprising the cover 16, viewed along the axis of rotation 12 from top to bottom, an adapter ring 30 for the cover 16, which adapter ring 30 provides the protrusions 27 for accommodating the fastening arms 25 of the grinding vessel 8, the grinding vessel 8, the coupling element 10 having the spring element 11 and the carrier element 15, as well as the rotating element 5, which carries the set of blades 13.

By means of the connection of the grinding vessel 8 to the preparation vessel 3, either inside the preparation vessel 3 or attached thereto, an operation of the grinder 9 is also possible, when a user is in the process of preparing a meal by means of the kitchen appliance 1. For example, grain can be ground in the grinding vessel 8, while the set of blades 13 currently mixes ingredients in the preparation vessel 3 into a dough. The grinder 9 can furthermore simultaneously also grind peppercorns and can add them to a stew, which is heated in the preparation vessel 3. So that the grinding material can pass directly from the chamber 23 into the preparation vessel 3, the bottom 29 is either removable or, in the alternative, is equipped with openings (not illustrated), through which the grinding material can fall out of the chamber 23 into the preparation vessel 3.

| List of Reference Numerals | |
|---|---|
| 1 | kitchen appliance |
| 2 | base unit |
| 3 | preparation vessel |
| 4 | rotary bearing |
| 5 | rotating element |
| 6 | grinding element |
| 7 | grinding area |
| 8 | grinding vessel |
| 9 | grinder |
| 10 | coupling element |
| 11 | spring element |
| 12 | axis of rotation |
| 13 | set of blades |
| 14 | blades |
| 15 | carrier element |
| 16 | cover |
| 17 | handle |
| 18 | closing roller |
| 19 | display |
| 20 | switch |
| 21 | drive shaft |
| 22 | chamber |
| 23 | chamber |
| 24 | opening |
| 25 | fastening arms |
| 26 | accommodation |
| 27 | protrusion |
| 28 | vessel cover |
| 29 | bottom |
| 30 | adapter ring |

What is claimed is:

1. An electric motor operated kitchen appliance comprising:
   a base unit having an electric motor;
   a preparation vessel that is configured to be connected to the base unit;
   a rotating element protruding from the preparation vessel, said rotating element being configured to be rotationally driven by the electric motor,
   a grinder formed from a grinding element and a grinding area of a grinding vessel held on the preparation vessel, wherein the grinding element is connected to the rotating element via a coupling element having a spring element configured for connecting the grinding element and a carrier element configured for connecting the rotating element, and
   wherein the coupling element spaces the grinding element from the rotating element with respect to an axial direction of the rotating element, and wherein with regard to a viewing direction perpendicular to the axial direction of the rotating element, the spring element is in the form of a ring and the carrier element is a fork-shaped attachment or a hook-shaped attachment.

2. The kitchen appliance according to claim 1, wherein the grinding element protrudes into the grinding vessel, and wherein the grinding area surrounds the grinding element in a circumferential direction, so that the grinding element rotates in response to a grinding operation inside the grinding area.

3. The kitchen appliance according to claim 1, wherein the grinder is embodied as a conical grinder.

4. The kitchen appliance according to claim 1, wherein the grinding vessel is arranged in the preparation vessel.

5. The kitchen appliance according to claim 1, wherein the grinding element is separably connected to the rotating element.

6. The kitchen appliance according to claim 1, wherein the-spring element provides a range of motion both parallel to a longitudinal extension of an axis of rotation of the rotating element and perpendicular thereto.

7. The kitchen appliance according to claim 1, wherein the rotating element has a blade set comprising a plurality of blades.

8. The kitchen appliance according to claim 7, wherein the carrier element can be secured between adjacent blades of the blade set.

9. The kitchen appliance according to claim 1, wherein the grinding vessel has a plurality of separate chambers for accommodating base products to be ground and/or for accommodating grinding material.

* * * * *